June 20, 1950   R. W. TALLMAN   2,511,953
GRAPHIC CHART DEVICE
Filed Jan. 29, 1948

Inventor
Russell W. Tallman
by M. Talbert Dick
Attorney

Witness
Merle A. Bjork.

UNITED STATES PATENT OFFICE 2,511,953

GRAPHIC CHART DEVICE

Russell W. Tallman, Des Moines, Iowa

Application January 29, 1948, Serial No. 5,093

1 Claim. (Cl. 35—24)

This invention relates to graphic charts device and is an improvement on United States Letters Patent, Number Re. 17,943, reissued February 3, 1931.

The principal object of my invention is to provide a manually operated graphic chart that permits the user to run the graph lines merely by tearing strips from a contrasting base board.

A further object of this invention is to provide a manually operated graphic chart that permits the user to run a plurality of parallel adjacent graph lines on a single subject or in a single box.

A still further object of my invention is to provide a rapid chart device for progressive graph work that is used without the use of ink, paint, brushes, or tools.

A still further object of this invention is to provide an improved means for securing the front tearable sheet to the contrasting back sheet or board.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

In almost all professions the making and using of graphic charts are indispensable. The usual method is to prepare the chart from and then run the graph lines by painting or inking. Obviously this is slow and tedious work and in the matter of progress charts they must be continuously changed and brought up to date. I have overcome such objections by providing a tearable chart capable of one or a plurality of graph lines on a given subject.

Figure 1:
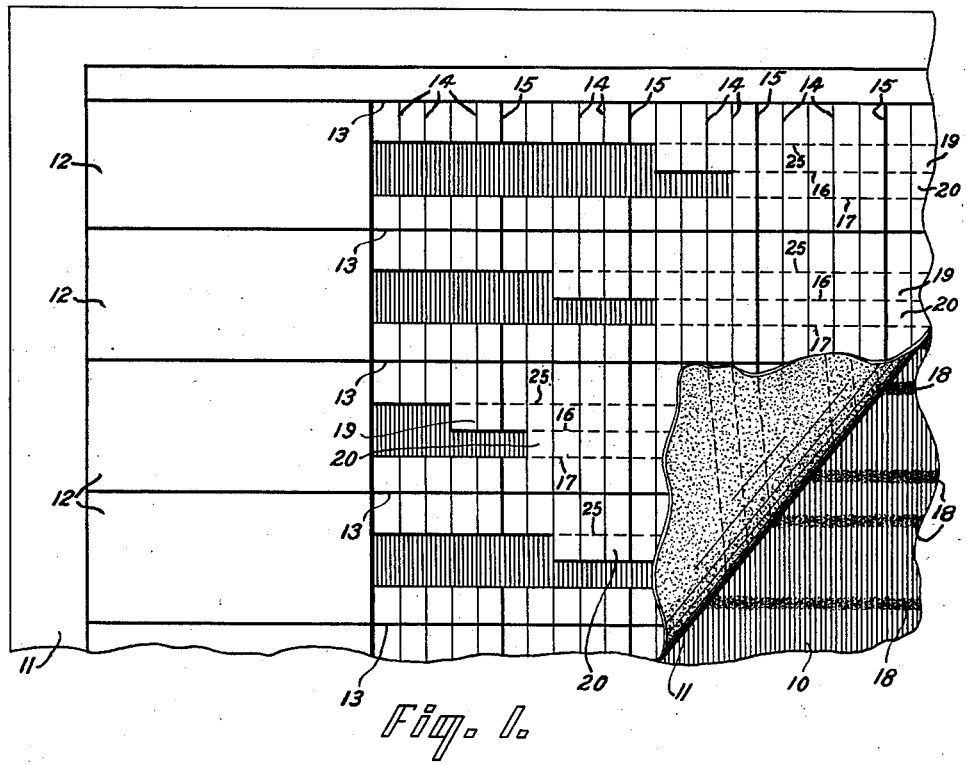
Fig. 1 is a plan view of my device with the front tearable sheet folded back at one edge to more fully illustrate its construction.

Referring to the drawings I have used the numeral 10 to designate the back sheet or back board. Imposed on this back sheet, and of a contrasting color is the front sheet 11. This front sheet may have any suitable indicia thereon, and marked in boxes, columns, lines or like. In the drawings I have provided a plurality of boxes 12, which may be used for subjects, individual names or like. These boxes 12 appear in a vertical row at the left of the sheet. The numeral 13 designates the confining horizontal lines to the right of the box spaces 12. The numerals 14 and 15 designate the usual vertical weight lines, spaced apart from each other, and bisecting the horizontal lines 13. This indicia on the sheet 11, however, is merely illustrative and may be of different arrangement and design. The numerals 25, 16, and 17 designate three horizontal, parallel, spaced apart weakened, or perforated lines in the sheet 12 and extending to the right from each box space 12 as shown in Fig. 1.

Figure 2:
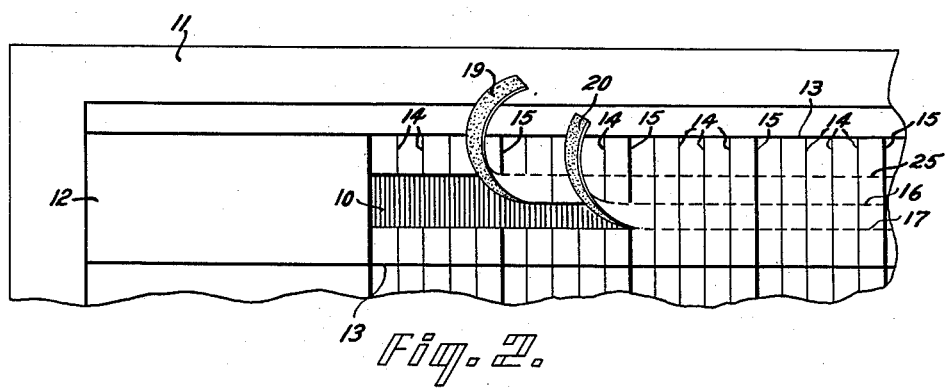
Fig. 2 is a plan view of my device showing how the adjacent strips are pulled up to run a double graph line.

One of the novel features of my device is the method of securing the front sheet 11 to the back sheet 10. I impose horizontal lines 18 of suitable adhesive on the face of the back sheet and when moist the front sheet is placed thereon. The placement of these glue lines is important and roughly are above and below each set of weakened lines 25, 16 and 17, as shown in Fig. 1. By this arrangement the front sheet will be rigidly held to the back sheet, but will be clear of the space between each group of lines 25, 16, and 17 thereby permitting the areas between these lines to be torn from in front of the backing sheet 10 as shown in Fig. 2. To operate my device it is merely necessary to lift a ribbon portion 19 out of the front sheet and away from the back sheet and then tear it off at the desired vertical progress line. The adjacent ribbon portion 20 is operated in the same manner. The upward lifting and tearing of either or both of the ribbons is made possible by the weakened lines of the front sheet. By placing the two ribbons adjacent each other, two graph lines may be run on a single subject. Furthermore only a minimum of glue is used on a given chart. If only one graph line is wanted on a single subject, only one ribbon may be pulled, or both ribbons may be pulled and torn off at a common progress line. Usually however, a plurality of graph lines will be run on a single subject, and this is a decided advantage over previous devices. In any event, when a portion of a ribbon or ribbons are removed the contrasting color of the face of the backing sheet will appear through the created opening in the front sheet, thereby providing the visible neat graph lines of the chart. To increase the length of the graphic lines of the chart at any time it is merely necessary to pull and tear off the required amount of the remaining portion of the ribbon or ribbons.

From the foregoing it will be seen that I have provided a multigraphic line chart that is refined in appearance and controlled and operated without any outside materials or equipment.

Some changes may be made in the construction and arrangement of my graphic chart device without departing from the real spirit and purpose of my invention, and it is my intention to cover by my claim, any modified forms of structure or use of mechanical equivalents which may be reasonably included within their scope.

I claim:

In a chart device, a base sheet member, a face sheet member of a contrasting color to said base sheet member; said face sheet member having three spaced apart parallel weakened lines producing two adjacent tearable ribbon strips, and lines of adhesive matter secured to the base member at each side of the outermost weakened lines for securing said two sheet members together exclusive of the area embraced by said weakened lines, whereby two juxtaposed tearable ribbon strips can individually be severed at desired points to expose portions of the base sheet member.

RUSSELL W. TALLMAN.

REFERENCES CITED

The following references are of record in the file of this patent:

UNITED STATES PATENTS

| Number | Name | Date |
|---|---|---|
| Re. 17,943 | Andres | Feb. 3, 1931 |
| 1,254,537 | Quigley | Jan. 22, 1918 |
| 1,554,467 | Stratton | Sept. 22, 1925 |
| 1,810,334 | Andres | June 16, 1931 |
| 1,838,353 | Andres | Dec. 29, 1931 |